United States Patent [19] [11] 4,138,315
Sander et al. [45] Feb. 6, 1979

[54] PRODUCTION OF PAPER SHEETS, BOARDS AND PULP MOLDED ARTICLES FROM FIBRIDS FROM THE CONSTITUENTS OF THE EFFLUENT OBTAINED IN THE MANUFACTURE OF STYRENE BEAD POLYMERS

[75] Inventors: Bruno Sander, Ludwigshafen; Eckhard Bonitz, Frankenthal; Heinz Voss, Friedelsheim; Wolfgang Gaerber, Wachenheim, all of Fed. Rep. of Germany

[73] Assignee: BASF Aktiengesellschaft, Ludwigshafen, Fed. Rep. of Germany

[21] Appl. No.: 881,746

[22] Filed: Feb. 27, 1978

Related U.S. Application Data

[63] Continuation of Ser. No. 674,127, Apr. 6, 1976, abandoned.

[30] Foreign Application Priority Data

Apr. 16, 1975 [DE] Fed. Rep. of Germany ....... 2516564

[51] Int. Cl.$^2$ ............................................. D21F 11/00
[52] U.S. Cl. ................................. 162/146; 162/157 R; 162/218; 162/228
[58] Field of Search ................... 162/146, 157 R, 218, 162/228; 210/45, 42 R; 260/29.6 PT, 29.7 PT; 264/180, 183, 87

[56] References Cited

U.S. PATENT DOCUMENTS

| 2,999,788 | 9/1961 | Morgan | 162/157 R |
| 3,123,518 | 3/1964 | Bundy | 162/146 |
| 3,829,378 | 8/1974 | Keppler et al. | 210/42 R |

Primary Examiner—Richard V. Fisher
Assistant Examiner—Peter Chin
Attorney, Agent, or Firm—Keil & Witherspoon

[57] ABSTRACT

Fibrids from the constituents of the effluent from the manufacture of styrene bead polymers are used to product papery sheet-like structures, boards and shaped articles.

6 Claims, 1 Drawing Figure

U.S. Patent   Feb. 6, 1979   4,138,315
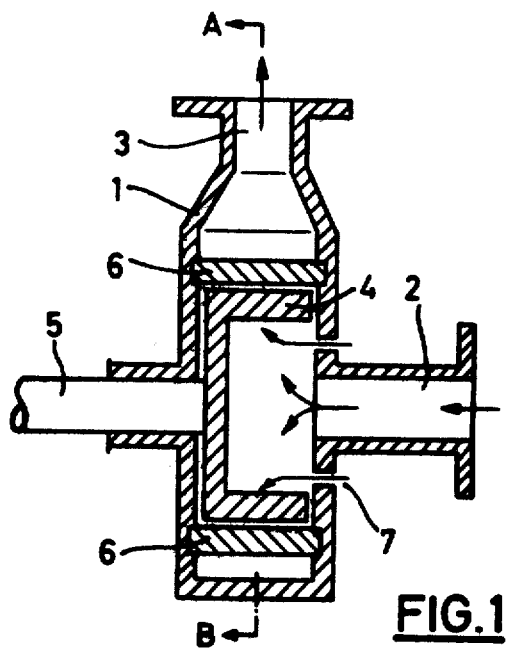
FIG.1
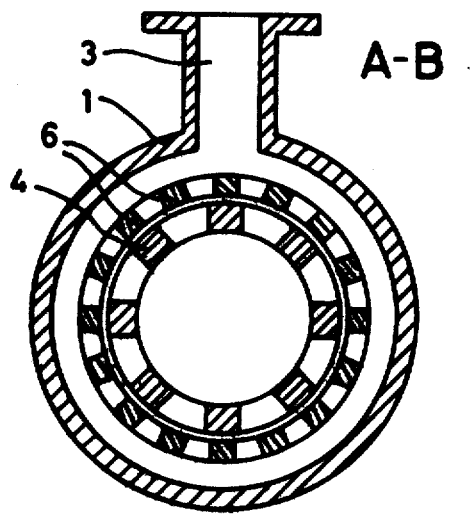
A-B

PRODUCTION OF PAPER SHEETS, BOARDS AND PULP MOLDED ARTICLES FROM FIBRIDS FROM THE CONSTITUENTS OF THE EFFLUENT OBTAINED IN THE MANUFACTURE OF STYRENE BEAD POLYMERS

This is a continuation, of application Ser. No. 674,127 filed Apr. 6, 1976 abandoned.

The present invention relates to the use of novel fibrids, which have been obtained by dissolving macromolecular waste materials in a solvent and introducing the resulting solution into a fluid precipitation medium under the action of shearing forces, for the manufacture of papery sheet-like structures, boards and shaped articles.

Although it has hitherto been possible to separate macromolecular waste materials contained in the waste water obtained in the bead polymerization of styrenes from the aqueous phase and to dispose of these materials by burning or dumping them, a profitable and technically reasonable utilization of these waste materials has not previously been disclosed.

Effective and economical processes for precipitating and separating off the macromolecular constituents of the waste water from the bead polymerization of styrenes are disclosed in German Laid-Open Application No. 2,057,734 and German Laid-Open Application No. 2,150,056. According to these, either copolymers of acrylic acid, or the alkali metal salts or ammonium salts of such copolymers, are used as precipitants, or the materials are flocculated by heating the effluent in the presence of persulfates.

It is an object of the present invention to convert the constituents isolated from the effluent from the bead polymerization of styrenes into industrially utilization products and thereby at the same time to reduce pollution of the environment by making it unnecessary to burn or dump these materials.

We have found that this object is achieved by the use of vent, isolated constituents of the aqueous phase from the bead polymerization of styrene in the presence of protective colloids, which remains after separating off the bead polymer, and by introducing the resulting solution into a fluid precipitation medium under the action of shearing forces, the fibrids having a specific surface area of from 10 to 30 m²/g, a freeness of from 15 to 30° SR, a length of from 0.5 to 20 mm and a thickness of from 1 to 10 μ, for the manufacture of papery sheet-like structures, boards and shaped articles.

The fibrids described above can be used, preferably as a mixture with cellulose, mechanical wood pulp, waste paper or other natural and synthetic fibrous materials, for the manufacture or papery sheet-like structures, boards and shaped articles.

In order to process the synthetic fibrids by conventional papermaking techniques they should have a very great tendency to form a web, ie. they should intimately felt and interlace with themselves or with other fibrous materials, eg. cellulose fibers, and should produce a good fiber bond. To manufacture coherent self-supporting webs on a paper machine from an aqueous suspension of the synthetic fibrids, the webs obtained must have an initial wet strength of at least 80 g. Furthermore, the webs must be easily removable from the wire of the paper machine. These requirements are satisfied when the fibrids according to the invention are used.

A further advantage of the use of the fibrids according to the invention is that dispersing assistants are not needed for the production of aqueous suspensions and for the manufacture of webs, boards and shaped articles from the said suspensions. The fibrids are strongly hydrophilic and absorb from 4 to 9 times their weight of water.

For the purposes of the present invention, the term macromolecular waste materials means the macromolecular constituents which remain in the effluent from the bead polymerization of styrene in the presence of protective colloids after separating off the bead polymer, which constituents have been separated and isolated from the effluent by precipitation or flocculation.

The styrene bead polymers are manufactured by conventional processes and are described, eg., in Houben-Weyl, Methoden der organischen Chemie, 4th edition (1961), volume XIV/1, pages 839 et seq. (Georg Thieme Verlag, Stuttgart). This publication also discloses the use of polyvinyl alcohol as a protective colloid. Polyvinyl alcohols containing ester groups may also be used as the protective colloid. German Pat. Nos. 801,233 and 1,151,117 disclose the bead polymerization of styrene with homopolymers and copolymers of vinylpyrrolidone as the protective colloid.

After such a dispersion polymerization has been carried out, the reaction mixture is cooled, and the polymer beads obtained are then separated from the milky turbid aqueous phase by centrifuging or filtering. The macromolecular constituents which remain in the aqueous phase comprise, based on 100 parts of macromolecular constituents, from 95.0 to 99.9 percent by weight of the styrene polymers or copolymers in question and from 0.1 to 5 percent by weight of the protective colloid remaining in the aqueous phase after bead polymerization, ie., in particular, polymers and copolymers of vinylpyrrolidone, polymers of vinyl alcohol, or polyvinyl alcohols containing ester groups. The content of organic carbon of the constituents of the aqueous phase is in general from 2,000 to 40,000 mg/l of effluent.

The aqueous phase which remains in the bead polymerization of styrenes in the presence of protective colloids after the bead polymer has been removed, namely the effluent, contains constituents of various compositions, depending on the nature of the bead polymerization. For the process according to the invention, effluent from any styrene bead polymerization process can be used. Styrene bead polymers in this context does not mean solely bead polymers of styrene. Rather, the term also encompasses bead polymers of styrene derivatives, eg. α-methylstyrene and p-chlorostyrene, or copolymers of at least 50 percent by weight of styrene or styrene derivatives with other monomers. Suitable comonomers are acrylonitrile, esters of acrylic acid or methacrylic acid with alcohols of 1 to 8 carbon atoms, N-vinyl compounds, eg. vinylcarbazole, or small amounts of compounds which contain two double bonds, eg. butadiene, divinylbenzene or butanediol diacrylate.

Conventional separation processes means the clarifying of the turbid aqueous phase obtained in the bead polymerization of styrenes in the presence of protective colloids by adding precipitants and flocculating agents, by treatment with adsorbents, eg. bentonite, by foam flotation or by micro-filtration. The aqueous phase from the bead polymerization should if possible be clarified in such a way that the predominantly macromolecular constituents are precipitated almost completely and can be isolated by filtering or centrifuging in a form in which they contain as little water as possible.

In a particularly suitable separation process described in German Laid-Open Application No. 2,057,743 for purifying effluent from the bead polymerization of styrenes in the presence of vinylpyrrolidone polymers as the protective colloid, there are added, per 100 parts of effluent, from 0.05 to 5.0 parts of water-soluble or water-dispersible high molecular weight compounds containing at least 10 percent by weight of polymerized acrylic acid units, or their alkali metal salts or ammonium salts, and the pH is reduced to below 3 by adding inorganic acids. The constituents of the aqueous phase which hereupon flocculate can be separated off by means of filters, perforated belt presses or decanters, to give a product having a solids content of about 50%. The flocculated waste material can be used either while moist or after it has been dried.

According to another separation process, disclosed in German Laid-Open Application No. 2,150,056, for purifying effluent from the bead polymerization of styrenes in the presence of vinylpyrrolidone polymers or vinyl alcohol polymers as protective colloids, the effluent constituents are flocculated by heating the effluent in the presence of from 0.02 to 5 percent by weight of sodium persulfate, potassium persulfate or ammonium persulfate. The constituents of the effluent isolated in this way are also suitable for carrying out the process according to the invention.

The macromolecular waste materials, which for the purposes of the present invention consist of the separated and isolated macromolecular constituents (identified above) of the effluent from the bead polymerization of styrene, may in addition contain from 1 to 50 percent by weight, preferably from 3 to 20 percent by weight, based on the macromolecular constituents, of the precipitant or flocculating agent employed. These may have various chemical constitutions, depending on the separation process employed. In the particularly suitable separation process disclosed in German Laid-Open Application No. 2,057,743 the flocculating agents are high molecular weight compounds which contain at least 10 percent by weight of polymerized acrylic acid units or of the alkali metal salts or ammonium salts of such compounds.

For the purposes of the invention, fibrids are to be understood as fibrous particles of macromolecular materials. In size, shape and morphology, the fibrids resemble cellulose fibers or beaten wood pulp. The manufacture of fibrids is disclosed, eg., in U.S. Pat. Nos. 2,999,788 and 2,988,782.

Dissolving the macromolecular waste material in an organic solvent means converting the solid and dry or moist waste material into a homogeneous mixture with the solvent. The distribution of the components may be molecularly disperse or macro-disperse. To achieve this, the macromolecular waste material, which may contain from 0.1 to 60 percent by weight of water or moisture, is dissolved or very finely dispersed in the solvent, preferably whilst stirring; this process is advantageously carried out at room temperature. Particularly suitable organic solvents have proved to be tetrahydrofuran and 1,4-dioxane, the former being preferred.

The fibrids are produced by introducing the resulting solution or dispersion into a fluid precipitation medium, whilst shearing forces act on the latter and on the solution or dispersion being run in. Water has proved a particularly suitable precipitation medium. However, the process can also be carried out with other precipitation media, eg. ethylene glycol. The only decisive factor is that the solvent should be soluble in, or miscible in all proportions with, the fluid precipitation medium, whereas the (initially) dissolved macromolecular material is insoluble in the said medium.

Shearing forces can be applied to the precipitation medium and to the polymer solution or polymer dispersion by mechanical means, using rotary equipment. Commercial machinery used for mixing, dispersing and homogenizing for instance polymer dispersions is suitable for this purpose. If the process is carried out batchwise, highspeed mixtures or Ultra-Turrax type apparatus which generates a field of shearing forces can be used. The action of the shearing forces on the fluid media generates a rotary motion, or turbulence.

In a preferred continuous method, the fluid precipitation medium and the polymer solution or polymer dispersion are made to rotate by means of a rotor in a housing. To produce the fibrids, the solution of the macromolecular waste material is introduced through a tube into the fluid precipitation medium, the outlet orifice of the tube being at a point at which the fluid media are at maximum acceleration. The fibrid suspension obtained is continuously discharged from a discharge nozzle.

In another preferred embodiment, the solution or dispersion of the macromolecular waste material is forced out through nozzles, and (when using a two-fluid nozzle) at the same time the fluid precipitation medium, at a flow rate of at least 5 m/sec, is thoroughly mixed with the solution or dispersion of the macromolecular material in a turbulence zone.

In all the variants of the process, stable discrete fibrids are obtained directly. They can be separated from the fluid precipitation medium, and from the greater part of the organic solvent, by filtering or centrifuging. The residual solvent is removed by washing with water on the filter or in the centrifuge. The organic solvents employed can be recovered by distillation, and recycled to the process.

The fibrids obtained according to the invention have a specific surface area of from 10 to 30 $m^2/g$, a freeness of from 15 to 30° SR, a length of from 0.5 to 20 mm and a thickness of from 1 to 10 $\mu$. They contain from 80 to 90 percent by weight of water. The fibrids are readily dispersible in water and thus may be used to produce aqueous suspensions.

The aqueous suspensions of the fibrids, if necessary after further dilution with water, can be employed, without additional use of dispersing assistants, on a paper machine or wet-laid non-woven machine, for the manufacture of papery sheet-like structures. In contrast, prior art synthetic fibrids, eg. those derived from polyethylenes, are preferably processed to give papery sheet-like structures when mixed with cellulose and after substantial amounts of dispersing assistants have been added.

Webs and felts which consist to the extent of 100% of the fibrids obtained exhibit a good fiber bond, a homogeneous formation and a surprisingly high initial wet strength. The fibrids can also be mixed with cellulose fibers in any desired ratio and the mixture can be processed on a paper machine to give self-supporting coherent sheets.

Another noteworthy feature of the fibrids when compared with cellulose fibers is the shorter time required for draining them, which permits higher production speeds and thus saves energy.

The fibrids may furthermore be used for the manufacture of machine-made board (cardboard) on cylinder machines and Fourdrinier machines or combined machines, which are described by H. Hentschel, Chemische Technologie der Zellstoff- und Papierherstellung, 2nd edition, 1962, pages 450–455, VEB Fachbuchverlag Leipzig.

Using this process, the fibrids can also be used as a mixture, in any desired ratio, with cellulose, mechanical wood pulp, waste paper or any other natural and synthetic fibrous materials for the manufacture of papery sheet-like structures, boards and shaped articles.

By using fibrids as a constituent for one or more layers of a board, the solids content of the webs after consolidation can be increased by from 10 to 25%. Furthermore, the high degree of whiteness of the fibrids improves the basic whiteness of the board. In addition, the fibrids give the board far greater bulk than is possible with conventional fibrous materials. Increases in bulk of up to 250% are achieved.

Shaped articles can also be advantageously manufactured by the pulp molding process, using the fibrids as one of the constituents. The pulp molding process is described in Handbuch der Papier- und Pappen-fabrikation, 2nd edition, volume II L-Z, 1971, page 1,357 et seq., Sangig-Verlag, Niederwalluf.

As a result of the short drainage time of the fibrids, the ease of drainage of the pulp in the molding and casting machines is improved, and production speeds increased. Moldings which contain added fibrids exhibit a higher degree of whiteness and greater resistance to yellowing. When manufacturing moldings by the pulp molding process, with fibrids as one of the constituents, increase in bulk of up to 250% can again be achieved. In this way it is possible to manufacture shaped articles having impact-resistant and shock-absorbing, ie. energy-absorbing, properties, which are therefore particularly suitable for use as packaging materials.

Methods of Measurement

The degree of fibrillation of the fibrids obtained was ascertained by determining the freeness by the Schopper-Riegler method (Korn-Burgstaller, Handbuch der Werkstoffprufung, 2nd edition, 1953, volume 4, Papier- und Zellstoffprufung, page 388 et seq., Springer-Verlag). For this determination, the fibrids are introduced into an aqueous suspension of constant stock consistency (2 g/l, 20° C). The amount of water which can be retained by the suspended fibrids under specific conditions is determined. The higher the fibrillation of the fibrids the greater is the amount of water absorbed (° Schopper-Riegler, ° SR). The Schopper-Riegler values for an unbeaten sulfite cellulose are from 12 to 15° SR. By way of example, the Shopper-Riegler values for the fibrids used according to the invention are from 15 to 30° SR.

The drainage time was also determined by the Schopper-Riegler method. In this, the time in seconds for 700 ml of water to drain out of one liter of a pulp diluted to 0.3 percent is measured.

The drainage time of the fibrids used according to the invention is from 4 to 6 seconds. Against this, the drainage time for bleached cellulose (35° SR) is from 30 to 35 seconds, for mechanical wood pulp (65° SR) from 90 to 120 seconds and for waste paper from 90 to 120 seconds.

The initial wet strengths are determined by means of the test instrument developed by W. Brecht and H. Fiebinger (Karl Frank, Taschenbuch der Papierprufung, 3rd enlarged edition, Eduard Roether Verlag, Darmstadt, 1958, page 59). Test strips 30 × 95 mm are produced from the fibrids to be tested on a laboratory sheet-forming apparatus by inserting an appropriate frame. The thickness of the test strips (weight per unit area) is determined by the amount of pulp used. The load in g at which the test strip tears is then measured by means of the test instrument.

The whiteness was determined by using the Zeiss Elrepho, Filter 8 (R 457), in accordance with DIN 53,145. The measurement is given in degrees of reflectance (%).

The specific surface area of the fibrids was determined by the BET nitrogen adsorption method (S. Brunauer, T. H. Emmett and E. Teller, J. Amer. Chem. Soc., 60 (1938), 309).

In the Examples, parts and percentages are by weight.

MANUFACTURE OF BEAD POLYMERS OF STYRENE, WITH POLYVINYLPYRROLIDONE AS THE PROTECTIVE COLLOID

A mixture of 100 parts of water, 0.05 part of sodium pyrophosphate, 0.05 part of sodium acetate, 100 parts of styrene, 0.3 part of dibenzoyl peroxide and 0.25 part of t-butyl perbenzoate is polymerized in a pressure-resistant stirred kettle, with constant stirring. To initiate polymerization, the mixture is heated to 80° C; it is then left for 7 hours at 80° C after which it is heated to 90° C; after 5 hours at 90° C it is heated to 110° C and is left for a further 4 hours at this temperature, whilst still stirring constantly. During polymerization — after a total of 2 hours' polymerization time at 80° C — 2.2 parts of a 10 percent strength aqueous solution of polyvinylpyrrolidone (K value = 90, measured by the method of H. Fikentscher, Cellulosechemie, 13. 60 (1932)) are added to the reaction mixture in the course of 5 minutes. After a total polymerization time of 6 hours at 80° C, 7 parts of n-pentane are introduced in the course of 15 minutes.

After completion of polymerization, the reaction mixture is cooled. The polymer beads obtained are separated from the aqueous phase (= effluent) which still contains suspended matter.

PRECIPITATION AND ISOLATION OF THE CONSTITUENTS OF THE EFFLUENT FROM THE BEAD POLYMERIZATION OF STYRENE ACCORDING TO GERMAN LOAD-OPEN APPLICATION No. 2,057,743

10 parts of a 20 percent strength aqueous solution of sodium polyacrylate are added to 1,000 parts of the effluent from the bead polymerization of styrene. The pH of the mixture is then brought to 2 by adding dilute sulfuric acid. The suspended matter flocculates spontaneously. The mixture is slowly stirred for a further 5–10 minutes. The flocculated material is then separated from the clear aqueous phase by means of a clarifying decanter. The solids content of the material discharged from the decanter is about 50%.

The solid, which gives an acid reaction, was used whilst still moist as the starting material for the Example which follows. It will hereinafter be referred to as "waste material".

MANUFACTURE OF FIBRIDS 2,200 parts of waste material having a moisture content of 50% were dissolved or very finely dispersed in 9,000 parts of tetrahydrofuran, with vigorous stirring.

The following apparatus is used to manufacture the fibrids (FIG. 1): A housing 1 having an inlet nozzle 2 and outlet nozzle 3 contains a rotor 4 which is driven at a shaft 5. This rotor 4 causes the fluid precipitation medium, which is present in the housing and is continuously fed in through the inlet nozzle 2, to rotate. The kinetic energy of the rotor is thereby transferred to the fluid precipitation medium. The fluid precipitation medium which has been accelerated is braked in an annular braking zone 6. This braking zone is formed by a ring-shaped stator which possesses sharp-edged orifices and baffles.

To produce the fibrids, the fluid mixture is introduced by means of a metering pump through a pipeline 7 having an internal diameter of 4 mm into the precipitation medium, ie. water, in the immediate vicinity of the rotor 4. At the same time, about a 20-fold volume of water was fed into the machine through the inlet nozzle 2. The fibrid suspension discharged from the outlet nozzle 3 was conveyed to a collecting tank. The fibrids accumulated at the surface and were skimmed off.

The removal of the water which still adhered to the material, and the subsequent removal of the residual solvent by washing with water, was effected in a helical-conveyor continuous centrifuge. After this stage, 7,386 parts of fibrids containing 86% of water were obtained. This corresponds to a solids content of fibrids of 1,034 parts.

It was thus possible to convert the waste material to fibrids with a yield of 94% of theory.

The discrete fibrids obtained, which are very finely fibrillated, have a length of from 0.5 to 20 mm and a thickness of from 3 to 6 $\mu$.

Measurements of the characteristic properties of the fibrids gave:
Specific surface are 13.6 m²g
Freeness 18° SR The fibrids obtained as described above were used in the Examples described below.

EXAMPLE 1

Standard sheets, which were easily removable from the wire, were produced from the fibrids on a lab. sheet-forming apparatus (Rapid-Kothen). The sheet had a homogeneous formation and good fiber bond. The initial wet strength was found to be 234 g.

EXAMPLE 2

A standard sheet which also had a homogeneous formation and good fiber bond was produced from 70 parts of fibrids and 30 parts of sulfite cellulose of freeness 35° SR. The wet strength was found to be 215 g.

MANUFACTURE OF MACHINE-MADE BOARD (CARDBOARD), USING FIBRIDS

EXAMPLE 3

Board weighing 250 g/m² is produced on a Fourdrinier machine.

The charge had the following composition: 50 parts of bleached sulfite cellulose (35° SR), 30 parts of unbleached mechanical wood pulp (65° SR), 20 parts of fibrids, 25 parts of filler (china clay ×1), 1.5 parts of rosin and 4.0 parts of alum.

A fiber pulp containing 5% of stuff is produced from these components by adding water. It was further treated by means of a deflaker and conical refiner. The concentration at the headbox of the machine was 1.15%. The pulp was drained on a Fourdrinier wire, two laying presses and a reversing press.

The solids content of the webs was as follows:
Upstream of the press section: 18.0%
Downstream of the press section: 42.0%

COMPARATIVE EXAMPLE 1

The procedure described in Example 3 is followed but without the addition of 20 parts of fibrids.

The solids content of the webs was as follows:
Upstream of the press section: 14.2%
Downstream of the press section: 34.0%

The use of fibrids increases the solids content of the webs by 23.5%.

EXAMPLE 4

Paper weighing 100 g/m² is prepared from 50 parts of bleached sulfite cellulose (35° SR) and 50 parts of fibrids on a Fourdrinier machine.

The whiteness is 90%.

COMPARATIVE EXAMPLE 2

A paper weighing 100 g/m³ is produced from 100% bleached sulfite cellulose (35° SR) by the method described in Example 4.

The whiteness is 80%.

EXAMPLES 5 AND 6 AND COMPARATIVE EXAMPLE 3

Duplex board weighing 330 g/m² is produced on a multi-cylinder machine.

| Composition of the Duplex board | Example 5 | Example 6 | Comparative Example 3 |
|---|---|---|---|
| Facing 80 g/m² | 100 parts of bleached sulfite cellulose | | (35° SR) |
| Backing 250 g/m² | 50 parts of bleached mechanical wood pulp (65° SR) of fibrids | 100 parts of fibrids | 100 parts of bleached mechanical wood pulp (65° SR) |
| Properties of the Duplex board | Example 5 | Example 6 | Comparative Example 3 |
| Thickness (mm) | 0.92 | 1.60 | 0.50 |
| Bulk (cm³/g) | 2.80 | 4.80 | 1.50 |
| Increase in bulk compared to the Duplex board according to Comparative Example 3 | 87% | 220% | — |

MANUFACTURE OF MOLDINGS BY THE PULP MOLDING PROCESS

EXAMPLES 7 AND 8 AND COMPARATIVE EXAMPLE 4

Egg trays weighing 60 g each are produced in a pulp molding machine of the 2-rotor/3-web type.

The stuff mixtures described below were pulped in a pulper. They then passed through a magnetic trap, a high density cleaner and a deflaker. The stuff mixtures were adjusted to a 1% solids content in the machine chest by adding water, and were then fed to the molding machine.

After draining the mold, the article is dried in a drying oven and then given a final molding in a mechanical press.

| Composition of the stuff | Example 7 | Example 8 | Comparative Example 4 |
| --- | --- | --- | --- |
| Bleached sufite cellulose (35° SR) | 10 parts | 10 parts | 10 parts |
| Waste paper | 20 parts | 20 parts | 20 parts |
| Unbleached mechanical wood pulp (65° SR) | 35 parts | — | 70 parts |
| Fibrids | 35 parts | 70 parts | — |
| Properties of the moldings | Example 7 | Example 8 | Comparative Example 4 |
| Bulk (cm³/g) | 3.6 | 6.4 | 2.0 |
| Increase in bulk over Comparative Example 4 | 80% | 220 | — |
| Whiteness (%) | 80–82 | 90–92 | 68–70 |

We claim:

1. Paper sheets, boards or pulp-molded articles prepared from aqueous suspensions of discrete fibrids, said fibrids being obtained by dissolving in an organic solvent the precipitated or flocculated and then isolated macromolecular constituents of the aqueous phase, as taken from the bead polymerization of styrene in the presence of protective colloids, which aqueous phase remains after separating off the bead polymer, and by introducing the resulting solution into water under the action of shearing forces sufficient to form fibrids having a specific surface area of from 10 to 30 m²/g, a freeness of from 15 to 30° SR, a length of from 0.5 to 20 mm and a thickness of from 1 to 10 μ, together with an absorption capacity for water of from 4 to 9 times their weight.

2. Paper sheets, boards or pulp-molded articles as claimed in claim 1, which are prepared from aqueous suspensions of fibrids in admixture with at least one other natural or synthetic fibrous paper-forming material.

3. Paper sheets, boards or pulp-molded articles as claimed in claim 1 wherein said fibrids are incorporated in paper sheets whose fibers are composed of said fibrids alone or said fibrids and sulfite cellulose fibers.

4. Paper sheets, boards or pulp-molded articles as claimed in claim 1 in the form of cardboard in which said fibrids are incorporated into the cardboard as part of the latter's fibers.

5. Paper sheets, boards or pulp-molded articles as claimed in claim 1, in which said articles are prepared in the absence of dispersing agents.

6. Paper sheets, boards or pulp-molded articles as claimed in claim 5, in which said organic solvent is selected from the group consisting of tetrahydrofurane and dioxane.

* * * * *